(12) United States Patent
Ahrendt

(10) Patent No.: US 6,564,541 B2
(45) Date of Patent: May 20, 2003

(54) METHOD FOR CONTROLLING THE DEPLOYMENT OF JET ENGINE THRUST REVERSERS

(75) Inventor: Terry Ahrendt, Tempe, AZ (US)

(73) Assignee: Honeywell International, Inc., Morristown, NJ (US)

( * ) Notice: Subject to any disclaimer, the term of this patent is extended or adjusted under 35 U.S.C. 154(b) by 0 days.

(21) Appl. No.: 10/287,297

(22) Filed: Nov. 4, 2002

(65) Prior Publication Data

US 2003/0066283 A1 Apr. 10, 2003

Related U.S. Application Data

(62) Division of application No. 09/846,914, filed on Apr. 30, 2001, now Pat. No. 6,519,929.

(51) Int. Cl.⁷ .................................................. F02K 1/32
(52) U.S. Cl. ...................................................... 60/204
(58) Field of Search ................................ 60/204, 226.2; 239/265.19

(56) References Cited

U.S. PATENT DOCUMENTS

| | | | |
|---|---|---|---|
| 1,175,346 A | | 3/1916 | Dearborn |
| 2,912,632 A | | 11/1959 | Turtil |
| 3,514,952 A | | 6/1970 | Schumacher et al. |
| 3,515,361 A | | 6/1970 | Blackburn |
| 3,618,880 A | | 11/1971 | Hagaman et al. |
| 3,621,763 A | | 11/1971 | Geyer |
| 3,696,895 A | * | 10/1972 | Schaffer et al. |
| 3,714,535 A | | 1/1973 | Krivak et al. |
| 3,719,324 A | * | 3/1973 | Uehling et al. ........ 239/265.19 |
| 3,795,853 A | | 3/1974 | Whitehouse |
| 3,815,357 A | | 6/1974 | Brennan |
| 3,932,058 A | | 1/1976 | Harner et al. |
| 3,936,226 A | | 2/1976 | Harner et al. |
| 4,005,822 A | | 2/1977 | Timms |
| 4,137,711 A | | 2/1979 | Montgomery |
| 4,184,107 A | | 1/1980 | Turini et al. |
| 4,191,094 A | | 3/1980 | Flippo |
| 4,284,930 A | | 8/1981 | Matty |
| 4,297,844 A | | 11/1981 | Halin et al. |
| 4,383,647 A | | 5/1983 | Woodruff et al. |
| 4,391,409 A | * | 7/1983 | Scholz ..................... 60/226.2 |
| 6,240,246 B1 | | 5/2001 | Evans |
| 6,307,339 B1 | | 10/2001 | Yourist et al. |
| 4,424,669 A | | 1/1984 | Fage |
| 4,437,783 A | | 3/1984 | Halin et al. |
| 4,442,928 A | | 4/1984 | Eastman |
| 4,458,582 A | * | 7/1984 | Linton |
| 4,458,863 A | | 7/1984 | Smith |
| 4,459,121 A | | 7/1984 | Gazzera et al. |
| 4,462,207 A | | 7/1984 | Hitchcock |
| 4,543,783 A | | 10/1985 | Greune et al. |
| 4,585,189 A | | 4/1986 | Buxton |
| 4,586,329 A | | 5/1986 | Carlin |
| 4,607,202 A | | 8/1986 | Koenig |
| 4,651,621 A | | 3/1987 | Eastman |
| 4,656,407 A | | 4/1987 | Burney |

(List continued on next page.)

Primary Examiner—Michael Koczo
(74) Attorney, Agent, or Firm—Keith A. Newburry, Esq.

(57) ABSTRACT

A system for controlling one or more jet engine thrust reversers includes a motor, a speed sensor, and a controller circuit. The motor is coupled to one or more jet engine moveable thrust reverser components for moving the one or more moveable thrust reverser components to at least a deployed position. The speed sensor is operable to sense the a rotational speed of the motor. The controller circuit has an output coupled to the motor for selectively energizing and deenergizing the motor in response to the speed sensor sensing that the rotational speed of the motor is, respectively, at or above a first predetermined rotational speed and at or below a second predetermined rotational speed. The system controls the deployment operation of the jet engine thrust reversers such that unwanted mechanical and electrical loads are avoided.

16 Claims, 6 Drawing Sheets

U.S. PATENT DOCUMENTS

| | | |
|---|---|---|
| 4,788,531 A | 11/1988 | Corwin et al. |
| 4,827,248 A | 5/1989 | Crudden et al. |
| 5,167,119 A | 12/1992 | Ward |
| 5,213,286 A | 5/1993 | Elliott et al. |
| 5,243,817 A | 9/1993 | Matthias |
| 5,267,436 A | 12/1993 | Wood, Jr. et al. |
| 5,282,719 A | 2/1994 | McCarty et al. |
| 5,313,788 A | 5/1994 | Wright et al. |
| 5,327,055 A | 7/1994 | Danielson et al. |
| 5,381,654 A | 1/1995 | Halin |
| 5,448,884 A | 9/1995 | Repp |
| 5,524,431 A | 6/1996 | Brusson et al. |
| 5,615,549 A | 4/1997 | Valleroy |
| 5,813,218 A | 9/1998 | Kohlbacher |
| 5,826,823 A | 10/1998 | Lymons et al. |
| 5,904,041 A | 5/1999 | Dhainault |
| 5,960,626 A | 10/1999 | Baudu et al. |
| 5,996,937 A | 12/1999 | Gonidec et al. |
| 6,009,356 A | 12/1999 | Monroe |
| 6,021,636 A | 2/2000 | Johnson et al. |
| 6,034,492 A | 3/2000 | Saito et al. |
| 6,042,053 A | 3/2000 | Sternberger et al. |
| 6,044,641 A | 4/2000 | Baudu et al. |
| 6,094,908 A | 8/2000 | Baudu et al. |
| 6,121,740 A | 9/2000 | Gale et al. |
| 6,167,694 B1 | 1/2001 | Davies |
| 6,178,867 B1 | 1/2001 | Kovac |
| 6,211,665 B1 | 4/2001 | Ahrendt et al. |

\* cited by examiner

METHOD FOR CONTROLLING THE DEPLOYMENT OF JET ENGINE THRUST REVERSERS

RELATED APPLICATIONS

This is a divisional of and claims priority from application Ser. No. 09/846,914 entitled "System and Method for Controlling The Deployment Of Jet Engine Thrust Reversers", filed Apr. 30, 2001, U.S. Pat. No. 6,519,929 which is incorporated herein by reference.

BACKGROUND OF THE INVENTION

The present invention relates to a system and method for controlling the movement of one or more jet engine thrust reverser components. More particularly, the present invention relates to a system and method for controlling the movement of one or more jet engine thrust reverser components during a deployment operation of the thrust reversers.

When jet-powered aircraft land, the landing gear brakes and imposed aerodynamic drag loads (e.g., flaps, spoilers, etc.) of the aircraft may not be sufficient to slow the aircraft down in the required amount of distance. Thus, jet engines on most aircraft include thrust reversers to enhance the stopping power of the aircraft. When deployed, thrust reversers redirect the rearward thrust of the jet engine to a forward direction, thus decelerating the aircraft. Because the jet thrust is directed forward, the aircraft will slow down upon landing.

Various thrust reverser designs exist in the art, and the particular design utilized depends, at least in part, on the engine manufacturer, the engine configuration, and the propulsion technology being used. Thrust reverser designs used most prominently with turbofan jet engines fall into three general categories: (1) cascade-type thrust reversers; (2) target-type thrust reversers; and (3) pivot door thrust reversers. As will be discussed more fully below, each of these designs employs a different type of "moveable thrust reverser component," as that term is defined herein below.

Cascade-type thrust reversers are normally used on high-bypass ratio jet engines. This type of thrust reverser is located at the engine's midsection and, when deployed, exposes and redirects air flow through a plurality of cascade vanes positioned on the outside of the engine. The moveable thrust reverser component in this design may include several translating sleeves or cowls ("transcowls") that are deployed to expose the cascade vanes. Target-type reversers, also referred to as clamshell reversers, are typically used with low-bypass ratio jet engines. Target-type thrust reversers use two doors as the moveable thrust reverser component to block the entire jet thrust coming from the rear of the engine. These doors are mounted on the aft portion of the engine and form the rear part of the engine nacelle. Pivot door thrust reversers may utilize four doors on the engine nacelle as the moveable thrust reverser component. In the deployed position, these doors extend outwardly from the nacelle to redirect air flow.

The primary use of thrust reversers is, as noted above, to enhance the stopping power of the aircraft, thereby shortening the stopping distance during landing. Hence, thrust reversers are primarily deployed during the landing process. More specifically, once the aircraft has touched down, the thrust reversers are deployed to assist in slowing the aircraft. Thereafter, when the thrust reversers are no longer needed, they are returned to their original, or stowed position.

When the thrust reversers are moved to the deployed position, the transcowls or doors are moved until the actuator elements to which they are attached reach a mechanical hard stop at the end of travel. In order to prevent structural damage, the actuator elements should come to a controlled stop against the mechanical hard stop. One problem associated with electromechanical thrust reverser systems in which the motive force for moving the thrust reversers is provided by electric motors, is that the aerodynamic loads imposed during aircraft landing tend, after a certain point during the deployment process, to accelerate the motors. Thus, if power is removed from the motors too soon before the actuator elements reach their mechanical hard stop, the motors will "free-wheel," being driven by the aerodynamic loads, up to speeds that may cause system damage. Conversely, if power is supplied to the motor until the actuator elements hit the mechanical hard stop, the motor will try to drive the actuator elements past the hard stops and impose unwanted mechanical and electrical loads on the system.

Hence, there is a need for a system and method for controlling the deployment of one or more jet engine thrust reversers that solves one or more of the problems identified above. Namely, a system and method for controlling jet engine thrust reverser deployment that avoids one or more of the following: unwanted motor accelerations due to aerodynamic loads imposed during thrust reverser deployment operations, unwanted motor actuation too near to or after the hard stops have been reached to avoid unwanted mechanical and electrical loads and related system damage.

SUMMARY OF THE INVENTION

The present invention provides a system and method for controlling jet engine thrust reverser deployment that avoids unwanted mechanical and electrical loads, and/or thrust reverser system damage. Specifically, and by the way of example only, the rotational speed of a motor that is provided for moving the thrust reversers to the deployed position is continuously sensed and compared to predetermined rotational motor speed values. The speed that the motor is controlled to rotate at is reduced from a non-zero value to zero when the thrust reversers reach a predetermined position. When the sensed rotational speed is at or above a first, upper predetermined rotational speed, power is applied to control the speed of the motor to decelerate the motor to zero. When the sensed rotational speed is at or below a second, lower predetermined rotational speed, power to the motor is removed. When power to the motor is removed, if the thrust reversers are not against their mechanical stops, the aiding aero loads will cause the motor to accelerate to, or above, the first predetermined rotational speed. This will cause power to be supplied to the motor, thereby causing it to decelerate toward the second predetermined speed. When the rotational speed reaches the second predetermined speed, the motor will again be deenergized. Thus, when the thrust reversers reach the predetermined position, the thrust reversers will limit cycle between the two predetermined speed limits until the mechanical stop is reached in a controlled manner.

In one aspect of the present invention, a jet engine thrust reverser control system includes an electric motor, one or more moveable thrust reverser components, a speed sensor, and a controller circuit. The moveable thrust reverser components are coupled to the motor, and are moveable between a stowed position and a deployed position. The speed sensor is operable to sense at least a rotational speed of the motor and produce a speed feedback signal. The controller circuit is coupled to receive the speed feedback signal and is operable, in response thereto, to energize and deenergize the motor when the rotational speed of the motor is, respectively, at or above a first predetermined rotational speed and at or below a second predetermined rotational speed.

In another aspect of the present invention, a jet engine thrust reverser control system includes moving means, speed sensing means, and controller means. The moving means is for moving one or more moveable thrust reverser components to at least a deployed position. The speed sensing means is for sensing a rotational speed of the moving means. The controller means is for (i) energizing the moving means when the speed sensing means senses that the rotational speed of the moving means is at or above a first predetermined rotational speed and (ii) deenergizing the moving means when the speed sensing means senses that the rotational speed of the moving means is at or below a second predetermined rotational.

In still another aspect of the present invention, a method of controlling a jet engine thrust reverser system includes powering a motive force providing component to move one or more moveable thrust reverser components toward at least a deployed position. At least a movement speed of the motive force providing component is sensed. Power to the motive force providing component is selectively applied and removed in response to the sensed movement speed of the motive force providing component being, respectively, at or above a first predetermined movement speed and at or below a second predetermined movement speed.

Other features and advantages of the present invention will become apparent from the following detailed description, taken in conjunction with the accompanying drawings, which illustrate, by way of example, the principles of the invention.

DETAILED DESCRIPTION OF THE INVENTION

Before proceeding with the detailed description of the invention, it is to be appreciated that the present invention is not limited to use in conjunction with a specific thrust reverser system design. Thus, although the present invention is explicitly described as being implemented in a cascade-type thrust reverser system, in which transcowls are used as the moveable thrust reverser component, it will be appreciated that it can be implemented in other thrust reverser system designs.

Figure 1:
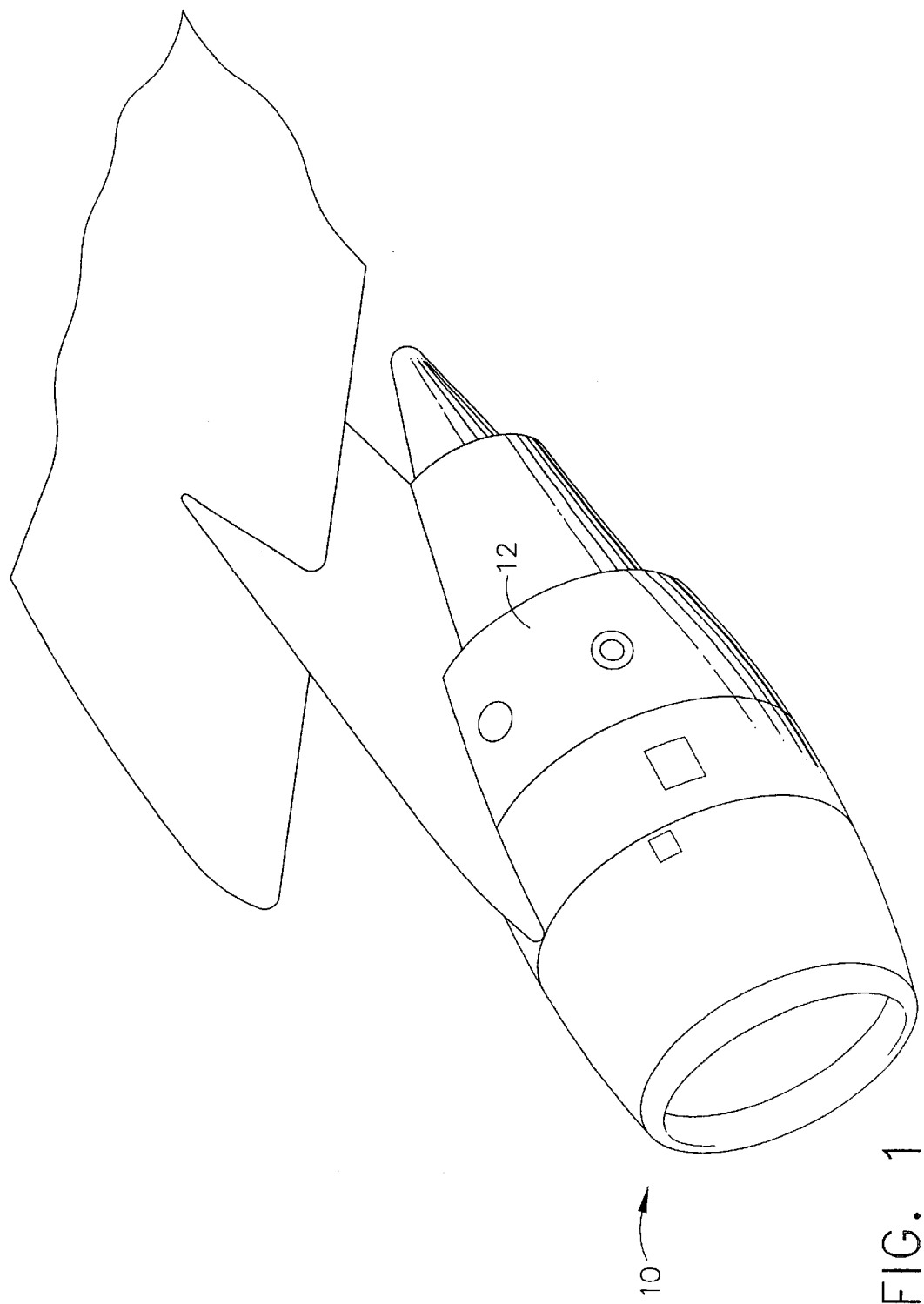
FIG. 1 is a perspective view of an aircraft engine.

Turning now to the description, and with reference first to FIG. 1, a perspective view of portions of an aircraft jet engine fan case 10 that incorporates a cascade-type thrust reverser is depicted. The engine fan case 10 includes a pair of semi-circular transcowls 12 that are positioned circumferentially on the outside of the fan case 10.

Figure 2:
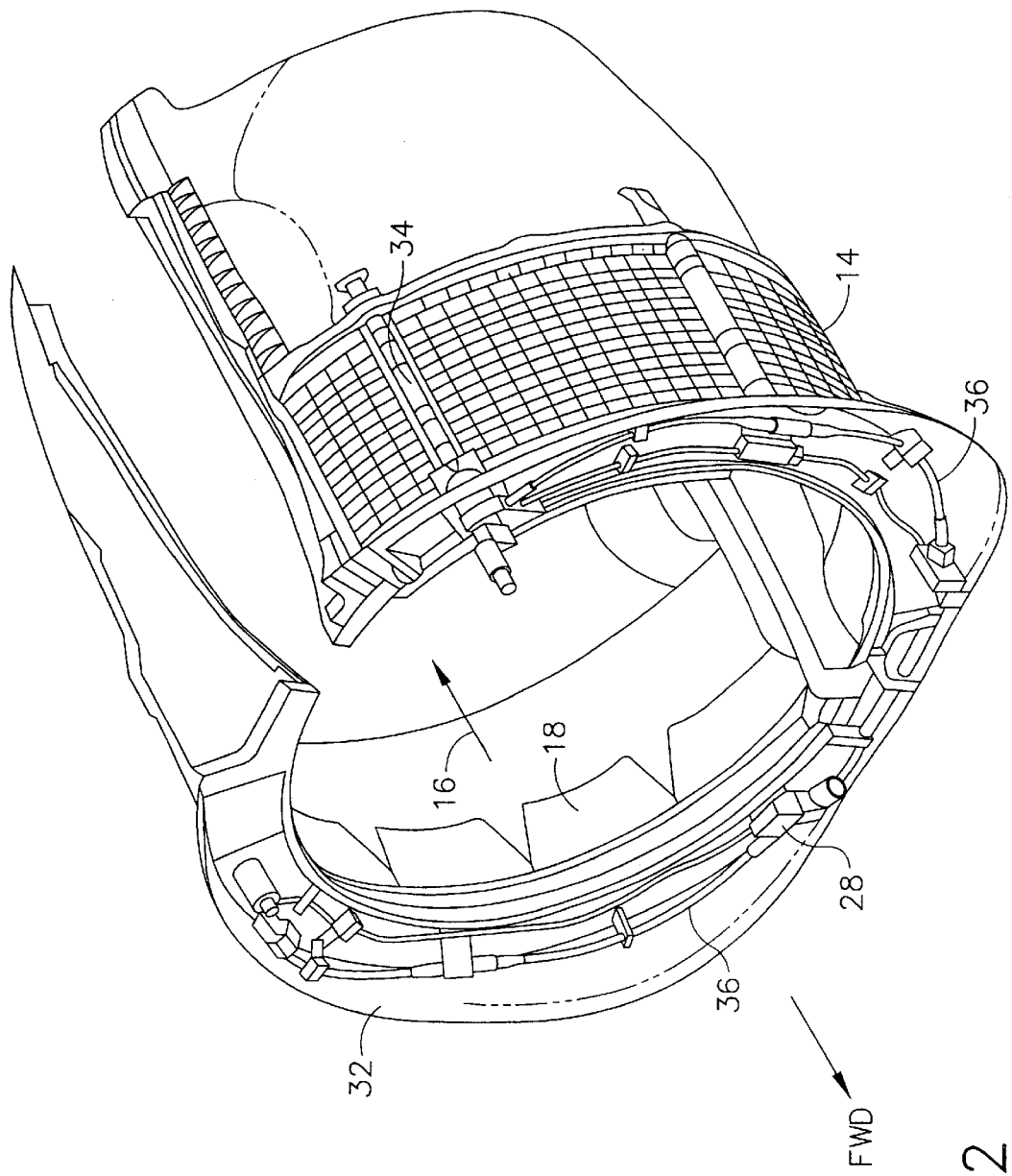
FIG. 2 is a perspective view of portions of an engine fan cowl and thrust reverser system utilized with the engine of FIG. 1.

As shown more particularly in FIG. 2, the transcowls 12 cover a plurality of cascade vanes 14, which are positioned between the transcowls 12 and a bypass air flow path 16. When in the stowed position, the transcowls 12 are pressed against one or more stow seals. The stow seals prevent air from flowing through the transcowls 12 when the thrust reversers are in the stowed position. A series of blocker doors 18 are mechanically linked to the transcowls 12 via a drag link that is rotatably connected to an inner wall that surrounds the engine case. In the stowed position, the blocker doors 18 form a portion of the inner wall and are therefore oriented parallel to the bypass air flow path 16. When the thrust reversers are commanded to deploy, the transcowls 12 are translated aft, causing the blocker doors 18 to rotate into a deployed position, such that the bypass air flow path 16 is blocked. This also causes the cascade vanes 14 to be exposed and the bypass air flow to be redirected out the cascade vanes 14. The re-direction of the bypass air flow in a forward direction creates a reverse thrust and, thus, works to slow the airplane.

One or more actuators 28 per engine are used to operate the transcowls 12. The actuators 28 are mounted to a stationary torque box 32 and each includes an actuator element 34, such as a ball screw, that is connected to the transcowls 12. The actuators 28 interconnect with each other via a synchronization mechanism, such as a plurality of flexible shafts 36. The flexible shafts 36 ensure that the actuators 28 move at the same rate. Thus, when the actuators 28 rotate, the actuator elements 34 and the connected transcowls 12 are caused to translate at the same rate.

Figure 3:
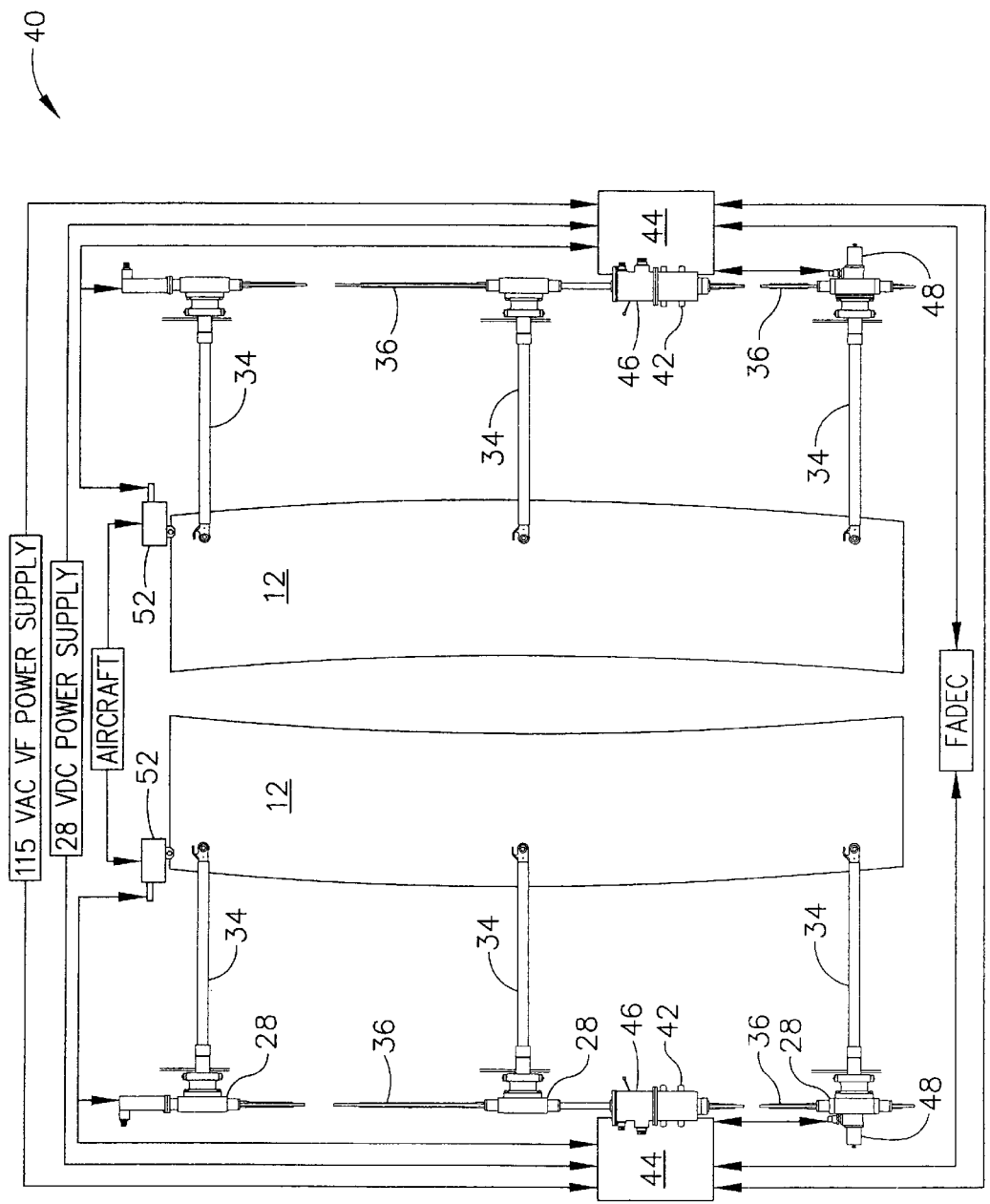
FIG. 3 is a simplified functional schematic representation of an exemplary thrust reverser control system according to an embodiment of the present invention.

A control system controls movement of the transcowls 12 from a locked and stowed position to an unlocked and deployed position for producing reverse thrust, and returns the transcowls 12 from the deployed position back to the stowed and locked position. A simplified functional schematic representation of an exemplary thrust reverser control system is depicted in FIG. 3. The control system 40 includes a plurality of actuators 28, each connected to a transcowl 12 by a respective actuator element 34, and interconnected by a plurality of flexible shafts 36. Each of the plurality of actuators 28 is driven by an electric motor 42, that is controlled by a controller circuit 44. Additional details of the controller circuit 44 and its operation will be discussed in more detail herein below. A plurality of locking mechanisms, including at least a primary lock 46 and a secondary lock 48, prevent unintended movement of the transcowls 12 from the stowed position.

A position sensing device 52 is used to sense the position of the transcowls 12. In a preferred embodiment, the position sensing device 52 is a limit switch that senses at least when the transcowls 12 attain a predetermined position, which will be discussed more fully below. It will, however, be appreciated that the position sensing device 52 is not limited to a limit switch. Rather, numerous other position sensing devices known in the art, non-limiting examples of which include an optical sensor, an LVDT, an RVDT, and a potentiometer, may also be used.

Figure 4:
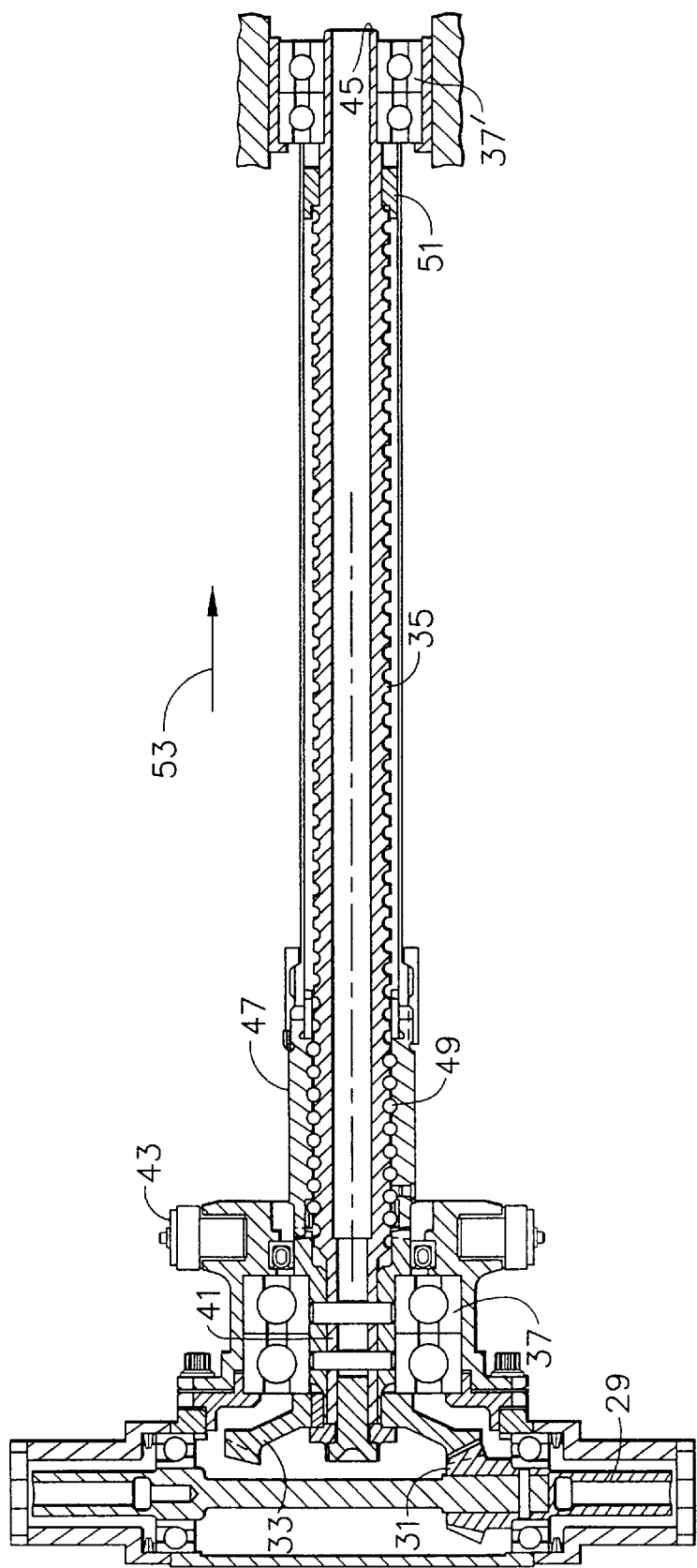
FIG. 4 is a cross section view of an actuator element utilized in the thrust reverser control system depicted in FIG. 3.

A preferred embodiment of an actuator 28 and an actuator element 34 utilized in the thrust reverser control system 40 is depicted in FIG. 4 and, for completeness of understanding, will now be discussed. The actuator 28 includes an input shaft 29 coupled to an unillustrated flexshaft 36. The input shaft 29 includes gearing 31 that mates with a bevel gear 33. The bevel gear 33 is coupled to a ball screw shaft 35, which is rotationally supported by a first duplex bearing assembly 37. A first end 41 of the ball screw shaft 35 is connected, via a gimbal mount 43, to the forward end of the engine nacelle support (not illustrated). A second end 45 of the ball screw shaft 35 is rotationally supported by a second duplex bearing assembly 37', which is connected to the aft end of the nacelle support (not illustrated). A ball nut 47, which is rotationally supported on the ball screw shaft 35 by a plurality of ball bearings 49, is attached to the transcowl 12 (not illustrated). Thus, rotation of the ball screw shaft 35 results in translation of the ball nut 47 and transcowl 12. A mechanical hard stop 51, positioned proximate the second duplex bearing assembly 37', stops translation of the ball nut 47, and thus the attached transcowl 12, in the deploy direction 53.

Figure 5:
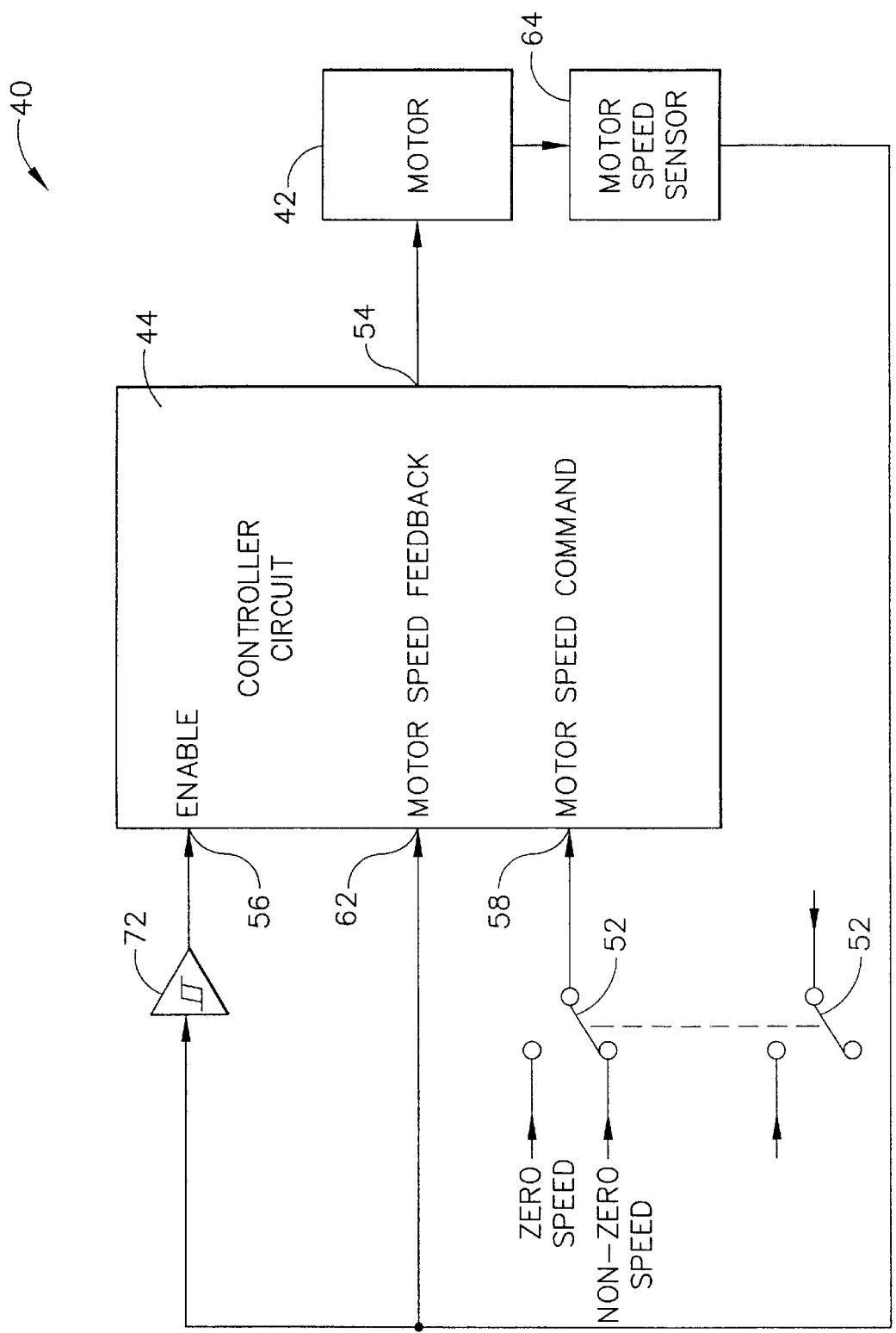
FIG. 5 is a simplified schematic representation of the thrust reverser control system depicted in FIG. 3, including a functional block diagram of a portion of the controller circuit.

Turning now to FIG. 5, which depicts a simplified schematic representation of the thrust reverser control system 40, along with a function block diagram of a portion of the controller circuit 44, a discussion of a preferred embodiment of the present invention will be provided. As depicted in FIG. 5, the controller circuit includes an output port 54 that is electrically coupled to the motor 42. The controller circuit further includes at least three input ports, which affect how the controller circuit 44 controls the operation of the motor 42. Specifically, the controller circuit 44 includes an ENABLE port 56, a MOTOR SPEED COMMAND port 58, and a MOTOR SPEED FEEDBACK port 62.

The ENABLE port 56 controls whether the controller circuit 44 can provide power to the motor 42. For example, if the controller circuit 44 is designed to operate in a "positive logic" scheme, then a logic "high" signal at the ENABLE port 56 enables the controller circuit 44 to provide power to the motor 42, whereas a logic "low" disables the controller circuit 44 from doing so. Conversely, if the controller circuit 44 is designed to operate in a "negative logic" scheme, then a logic "low" signal at the ENABLE port 56 enables the controller circuit 44 to provide power to the motor, and a logic "high" disables the controller circuit 44. In either case, a comparator circuit 72, such as a hysteretic comparator, includes an output that is electrically coupled to the ENABLE port 56. As will be discussed more fully below, the comparator circuit 72 supplies the appropriate logic level signal to the ENABLE port 56 to enable or disable the controller circuit 44.

The signal supplied to the MOTOR SPEED COMMAND port 58 sets the target rotational speed at which the controller circuit 44 will cause the motor 42 to rotate. A plurality of speed command signals are available to be selectively coupled to the MOTOR SPEED COMMAND port 58. In a preferred embodiment, the plurality of speed command signals include a "zero" speed command signal and a "non-zero" (or high) speed command signal. When the non-zero speed command signal is coupled to the MOTOR SPEED COMMAND port 58, the controller circuit 44 (when enabled) sets the target rotational speed of the motor 42 to a non-zero magnitude. Conversely, when the zero speed command signal is coupled to the MOTOR SPEED COMMAND port 58, the controller circuit 44 (when enabled) sets the target rotational speed of the motor 42 to zero. The circumstances under which the zero and non-zero speed command signals are coupled to the MOTOR SPEED COMMAND port 58 are discussed more fully below. The skilled artisan will, however, appreciate that this particular non-zero rotational speed magnitude is only exemplary of a preferred embodiment, and that the magnitude may be varied to acheive desired system response. The particular motor 42 may be one of numerous motor designs known in the art, including both DC and AC motors. The particular motor design and non-zero rotational speed magnitude are design variables chosen to meet the requirements of the particular thrust reverser system.

The MOTOR SPEED FEEDBACK port 62 is coupled to receive a speed signal from a speed sensor 64. The speed sensor 64 is connected to sense the rotational speed of the motor 42, and may be any one of numerous rotational speed sensors known in the art. In a preferred embodiment, however, the sensor 64 is a resolver unit coupled to the motor 42. In any event, the signal from the speed sensor is coupled to the MOTOR SPEED FEEDBACK port 62 and is compared, within the controller circuit 44, to the speed command signal coupled to the MOTOR SPEED COMMAND port 58. The result of the comparison determines the magnitude of the current applied to the motor 42. For example, if the signal from speed sensor 64 indicates that the motor 42 is rotating faster than what is commanded on the MOTOR SPEED COMMAND input port 58, then the current magnitude supplied to the motor 42 is adjusted to cause the motor speed to decrease. Conversely, if the signal from the speed sensor 64 indicates that the motor is rotating slower than what is commanded, the current magnitude supplied to the motor 42 is adjusted to cause the motor speed to increase. Thus, the controller circuit 44, when enabled, controls the rotational speed of the motor 42 via this closed loop feedback control configuration.

Figure 6:
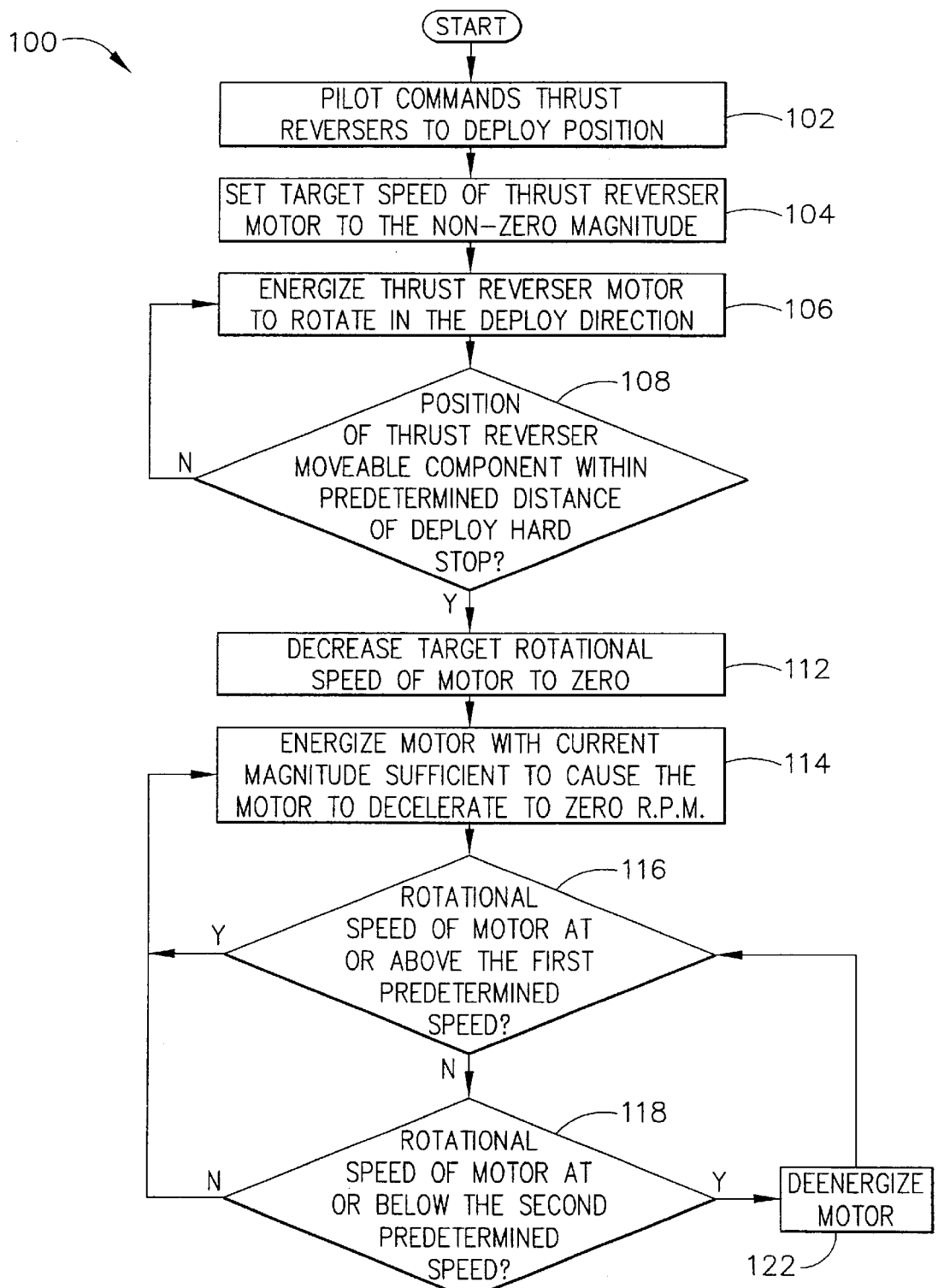
FIG. 6 is a flowchart depicting the method of controlling the deployment of the thrust reversers according to the present invention.

Having described the thrust reverser control system 40 specifically from a structural standpoint, and generally from an functional standpoint, a specific description of a particular functional aspect of the present invention will now be provided. In this regard, reference should now be made to FIGS. 5 and 6 in combination, while a description of a deployment operation of the thrust reverser system is provided. This description is predicated on the thrust reverser system initially being in the stowed position, and is being moved to the deployed position. Additionally, the parenthetical references to "STEPs" correspond to the particular reference numerals of the methodological flow 100 depicted in FIG. 6.

With the above-described background in mind, the description of the deployment operation 100 will now be provided. When the aircraft touches down and the thrust reversers are needed, the pilot commands the thrust reversers to move to the deployed position (STEP 102). At this point, the target rotational speed of the thrust revereser motor 42 is set to the non-zero magnitude by coupling the non-zero speed command to the MOTOR SPEED COMMAND port 58 (STEP 104). Thus, the motor 42 is energized to rotate in the deploy direction with a current magnitude sufficient to rotate at the non-zero target speed (STEP 106), causing the actuators 28 to rotatate, which in turn causes the actuator elements 34 to translate the connected transcowls 12 toward the deployed position.

While the transcowls 12 are translating toward the deployed position, the position sensing device 52 senses whether or not the transcowls 12 have attained a predetermined position relative to the fully deployed position (STEP 108). It is noted that, in a preferred embodiment, the predetermined position is within 10% of the fully deployed position; however, the invention is not limited to this particular predetermined position. The motor 42 continues to translate the transcowls 12 toward the deployed position, while being controlled to rotate at the non-zero rotational speed, until the predetermined position is attained.

As mentioned briefly above, the comparator circuit 72 supplies the appropriate logic level signal to the ENABLE port 56 to enable or disable the controller circuit 44. This logic level is based upon a comparison made by the comparator circuit 72. Specifically, the comparator circuit 72 receives the rotational speed sensed by the motor speed sensor 64 and determines whether the rotational speed of the motor 42 is at or above a first predetermined speed, or at or below a second predetermined rotational speed. If the rotational speed of the motor, as sensed by the speed sensor 64, is at or above the first predetermined speed, then the comparator circuit 72 outputs the appropriate logic level signal to enable the controller circuit 44 to decelerate the motor. Conversely, if the speed sensor 64 senses that the motor speed is at or below the second predetermined speed, then the comparator circuit 72 outputs the appropriate logic level signal to disable the controller circuit 44. The reason behind this particular functionality will become more apparent from the descriptions below. In a preferred embodiment the first predetermined rotational speed is set to 1000 r.p.m., and the second predetermined rotational speed is set to 300 r.p.m. It will be appreciated that other values may be selected for the first and second predetermined rotational speeds, as well as other numbers of predetermined rotational speeds for comparison, in order to meet a required system response.

Since the comparator circuit 72 continuously receives the sensed motor rotational speed from the sensor 64, the comparator circuit 72 performs the above-described functionality while the transcowls 12 are translating to the predetermined deployed position. As long as the motor speed remains above the second, lower predetermined rotational speed, the controller circuit 44 will remain enabled and, thus, the motor 42 will remain energized to rotate at the non-zero rotational speed. Otherwise, if the motor speed is below the second predetermined rotational speed, the controller circuit 44 will be disabled, and the motor 42 will be deenergized. Considering the magnitudes of the first and second predetermined rotational speeds relative to the non-zero target rotational speed, the comparator circuit 72 will continue to enable the controller circuit 44, at least until the predetermined position is attained, unless the system malfunctions.

Once the predetermined position is attained, the target rotational speed of the motor is set to zero (STEP 112), and the motor is subsequently energized with a current magnitude sufficient to cause the motor to decelerate to zero r.p.m. (STEP 114). The hysteretic comparator 72 monitors the speed of the motor 42, via the speed sensor 64, to determine whether the rotational speed of the motor 42 is at or above the first predetermined speed (STEP 116) or at or below the second predetermined rotational speed (STEP 118). As long as the rotational speed of the motor is at or above the first, upper predetermined rotational speed, the controller circuit 44 will be enabled and will energize the motor 42 with a current to decelerate the motor 42. Once the rotational speed of the motor 42 is at or below the second predetermined rotational speed, the hysteretic comparator 72 disables the controller circuit 44, which in turn deenergizes the motor 42 (STEP 122). If the actuator elements 34 have not reached the hard stops 51, then the aerodynamic loads will cause the motor 42 to free-wheel and accelerate. If the motor 42 is caused to accelerate up to the second predetermined rotational speed (STEP 116), then the hysteretic comparator 72 will once again enable the controller circuit 44, which will energize the motor with a current magnitude sufficient to decelerate the motor to zero r.p.m. (STEP 114).

The above-described limit cycle will continue until the actuator elements 34 reach the hard stops 51. Once this occurs, the motor 42 will no longer be accelerated by the aerodynamic loads when deenergized, the hysteretic comparator 72 will maintain the controller circuit 44 disabled, and the motor 42 will remain deenergized.

As indicated previously, the present invention is not limited to use with a cascade-type thrust reverser system, but can be incorporated into other thrust reverser design types. Moreover, the methodology of the present invention is not limited to use with an electric or electromechanical thrust reverser actuation system. Rather, the methodology of the present invention can be incorporated into other actuation system designs, including hydraulic and pneumatic.

Additionally, the circuit components of the present invention are not limited to that explicitly depicted herein. Indeed, the circuit components may be formed of either discrete components, or incorporated into a single integrated circuit. Moreover, the process carried out by the electrical components may be realized using software driven devices, or it may be carried out using analog devices and signals, or a combination of both.

While the invention has been described with reference to a preferred embodiment, it will be understood by those skilled in the art that various changes may be made and equivalents may be substituted for elements thereof without departing from the scope of the invention. In addition, many modifications may be made to adapt to a particular situation or material to the teachings of the invention without departing from the essential scope thereof Therefore, it is intended that the invention not be limited to the particular embodiment disclosed as the best mode contemplated for carrying out this invention, but that the invention will include all embodiments falling within the scope of the appended claims.

I claim:

1. A method of controlling a jet engine thrust reverser system, comprising:
   powering a motive force providing component to move a moveable thrust reverser component toward a deployed position;
   sensing a movement speed of the motive force providing component; and
   applying power to the motive force providing component when the sensed movement speed of the motive force providing component is at or above a first predetermined movement speed and removing power to the motive force providing component when the sensed speed is at or below a second predetermined movement speed.

2. The method of claim 1, further comprising:
   comparing the sensed movement speed of the motive force providing component to the first and second predetermined movement speeds; and
   in response to this comparison, either applying power to the motive force providing component when the movement speed is at or above the first predetermined movement speed, or removing power to the motive force providing component when the movement speed is at or below the second predetermined movement speed.

3. The method of claim 1, further comprising:
   setting a target movement speed of the motive force providing component in response to selectively providing one of a plurality of speed commands.

4. The method of claim 3, wherein the plurality of speed commands includes at least a zero speed command and a non-zero speed command.

5. The method of claim 4, further comprising:

sensing at least when the one or more moveable thrust reverser components attain a predetermined position relative to the deployed position; and providing the zero speed command in response to the one or more moveable thrust reverser components attaining the predetermined position.

6. The method of claim 5, wherein the predetermined position is a position within 10% of a fully deployed position.

7. The method of claim 1, wherein the first predetermined rotational speed is greater than the second predetermined rotational speed.

8. A method of controlling a jet engine thrust reverser system, comprising:

powering a motive force providing component to move one or more moveable thrust reverser components toward at least a deployed position;

sensing a movement speed of the motive force providing component;

comparing the sensed movement speed of the motive force providing component to at least a first and a second predetermined movement speed; and in response to this comparison, either applying power to the motive force providing component when the movement speed is at or above the first predetermined movement speed, or removing power to the motive force providing component when the movement speed is at or below the second predetermined movement speed.

9. The method of claim 8, further comprising:

setting a target movement speed of the motive force providing component in response to selectively providing one of a plurality of speed commands.

10. The method of claim 9, wherein the plurality of speed commands includes at least a zero speed command and a non-zero speed command.

11. The method of claim 10, further comprising:

sensing at least when the one or more moveable thrust reverser components attain a predetermined position relative to the deployed position; and providing the zero speed command in response to the one or more moveable thrust reverser components attaining the predetermined position.

12. The method of claim 11, wherein the predetermined position is a position within 10% of a fully deployed position.

13. The method of claim 8, wherein the first predetermined rotational speed is greater than the second predetermined rotational speed.

14. A method of controlling a jet engine thrust reverser system, comprising:

setting a target movement speed to one of at least a zero and a non-zero movement speed;

moving one or more moveable thrust reverser components toward at least a deployed position by driving a motive force providing component at the target movement speed;

sensing at least a movement speed of the motive force providing component;

sensing at least when the one or more moveable thrust reverser components attain a predetermined position relative to the deployed position;

comparing the sensed movement speed of the motive force providing component to at least a first and a second predetermined movement speed;

applying power to drive the motive force providing component when the movement speed is at or above the first predetermined movement speed;

removing the power to drive the motive force providing component when the movement speed is at or below the second predetermined movement speed, wherein the target movement speed is set to the zero movement speed in response to the sensing device sensing that the predetermined position is attained.

15. The method of claim 8, wherein the predetermined position is a position within 10% of a fully deployed position.

16. The method of claim 14, wherein the first predetermined rotational speed is greater than the second predetermined rotational speed.

* * * * *